United States Patent Office 3,576,001
Patented Apr. 20, 1971

3,576,001
2-AMINO-3-ARYL-3H-INDOL-3-OLS AND THEIR METHOD OF PREPARATION
Stanley C. Bell, Narberth, and Carl Gochman, Philadelphia, Pa., assignors to American Home Products Corporation, New York, N.Y.
No Drawing. Filed Dec. 28, 1967, Ser. No. 694,066
Int. Cl. C07d 27/36
U.S. Cl. 260—326.12
6 Claims

ABSTRACT OF THE DISCLOSURE

A new process is disclosed reacting a 2-benzoyl acylanilide with ionic cyanides to form new 3-aryl-2-imino-3-indolinols and 2-amino-3-aryl-3H-indol-3-ols. The products may be further processed into a number of new derivatives which have therapeutic activity in experimental and comparative pharmacology.

---

This invention relates to new 3-aryl-2-imino-3-indolinols and 2-amino-3-aryl-3H-indol-3-ols, and to a new process for their preparation by reacting a 2-benzoyl acylanilide with an ionic cyanide.

The new and novel compounds within the purview of the present invention are exemplified by those having the following formula:

Where W is (I)

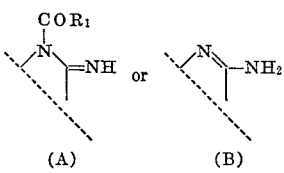

(A)          (B)

$R_1$ is lower alkyl, halo(lower)alkyl, and dihalo(lower)alkyl;
$R_2$ and $R_3$ are each hydrogen, halogen, lower alkyl, or lower alkoxy;
$R_4$ and $R_5$ are each hydrogen or sulfamoyl;
As used herein the terms "lower alkyl," "lower alkoxy," and the like described groups containing from one to about eight carbon atoms.

Typical examples of the compounds of this invention which are depicted by structural Formula IA are:
5-chloro-1-(2,2-dichloroacetyl)-2-imino - 3 - (m-sulfamoylphenyl)-3-indolinol;
5-chloro-3-(2-chloro-5-sulfamoylphenyl - 1 - (2,2-dichloroacetyl)-2-imino-3-indolinol.
Alternatively, the compounds of this invention which are represented by structural Formula IB are typified by:
2-amino-5-chloro-3-phenyl-3H-indol-3-ol; and
2-amino-5-chloro-3-(m-sulfamoylphenyl) - 3H-indol-3-ol.
The 3-aryl-2-imino-3-indolinols and the 2-amino-3-aryl-3H-indol-3-ols of this invention may be prepared by the process which is hereinafter schematically illustrated:

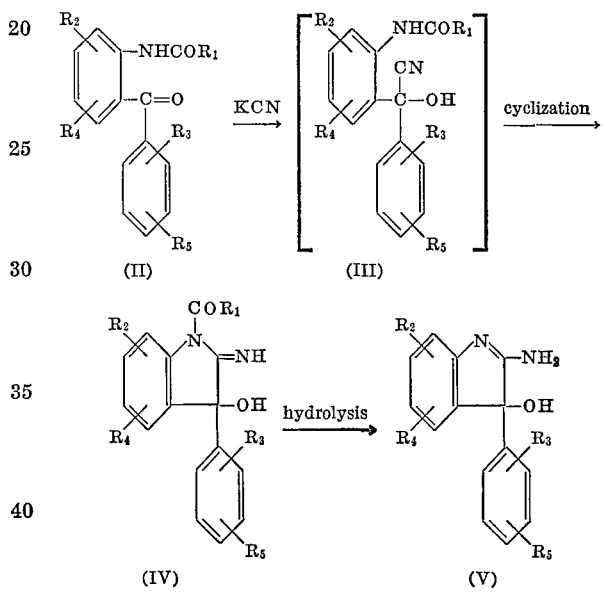

Where $R_1$–$R_5$ are defined as above.

A 2-benzoyl acylanilide (II) is mixed with an ionic cyanide in the presence of a proton donor, such as water. The mechanism of the process is believed to include the formation of an intermediate (III) which is not separated or recovered. After a predetermined period as hereinafter set forth the reaction mixture is concentrated to dryness, and the residue dissolved in water. The solution is acidified, for example, with acetic acid, and a solid containing a mixture of compounds (IV) and (V) precipitates. The mixture is suspended in an acid, such as dilute hydrochloric acid, and filtered. The collected solid is an appropriate 3-aryl-2-imino-3-indolinol (IV). The filtrate is then neutralized with a base, for instance with sodium carbonate, and the resulting precipitate is a 2-amino-3-aryl-3H-indol-3-ol (V) which may be further purified by recrystallization from an alcohol-water solvent.

The ionic cyanide employed as a reactant in the above reaction may be sodium cyanide, lithium cyanide, calcium cyanide, cuprous cyanide, or preferably, potassium, cyanide. The reaction is preferably carried out in an organic solvent that is miscible with the proton donor and does not react with the ionic cyanide. Such solvents include alkanols, dioxane, dimethoxyethane and the like, ethanol being preferred. The reaction is carried out at a temperature between about 0 to 50° C. for between one-quarter of an hour and seventy-two hours. When the reaction is conducted at relatively lower temperatures and shorter time periods, the resulting mixture of products contains a preponderance of a 3-aryl-2-imino-3-indolinol (IV). Alternatively, when the reaction is conducted at relatively higher temperatures and longer time periods, the resulting mixture of the products contains a preponderance of a 2-amino-3-aryl-3H-indol-3-ols (V). The latter reaction and the method of separating the 2-amino-3-aryl-3H-indol-3-ols is exemplified in Example I.

The 3-aryl-2-amino-3H-indol-3-ols (IV) which are separated from the above reaction may be hydrolyzed by conventional procedures to form the corresponding 2-amino-3-aryl-3H-indol-3-ols (V), for instance by mixing with an ionic cyanide, or a strong base, such as sodium hydroxide, for about 15 minutes to about 10 hours at about room temperature to about 50° C.

The 2-benzoylacylanilides which are use as starting materials to prepare the compounds of the present invention may be prepared as described in United States patent application Ser. No. 689,009 filed Dec. 8, 1967 by Stanley C. Bell et al. and titled "Novel Synthesis of Quinazolines."

The 2-amino-3-aryl-3H-indols-3-ols (V) are useful as intermediates in the preparation of compounds of the co-filed and copending United States patent application of Stanley C. Bell et al. entitled "2-Acylamido-3-Aryl-3H-Indol-3-ol Esters and Related Compounds" having Ser. No. 694,089, filed Dec. 28, 1967. The latter compounds have central nervous system activity as depressants.

In order more clearly to disclose the nature of the present invention, specific examples of the practice of the invention are hereinafter given. It should be understood, however, that this is done solely by way of example and is intended neither to delineate the scope of the invention nor limit the ambit of the appended claims.

EXAMPLE I

This example illustrates the preparation of 2-amino-5-chloro-3-phenyl-3H-indol-3-ol, a compound of Formula V, from a compound of Formula II.

To a suspension of 10.0 grams (g.) of 2'-benzoyl-2,2,4'-trichloroacetanilide in 150 milliliters (ml.) of ethanol is added a solution of 6.0 g. of potassium cyanide in 50 ml. of water. After stirring about 16 hours the reaction mixture is filtered from insoluble material and diluted with water to precipitate 7.0 g. of product. Recrystallization from acetonitrile gives the pure compound, 2-amino-5-chloro-3-phenyl-3H-indol-3-ol, having a melting point (M.P.) of 215–217° C.

Based on the formula $C_{14}H_{11}ClN_2O$ it was calculated that the elemental analysis by weight would be 64.99 percent carbon, 4.29 percent hydrogen, 10.83 percent nitrogen, and 13.20 percent chlorine. The product was analysed and the content was found to be 65.02 percent carbon, 3.98 percent hydrogen, 10.70 percent nitrogen and 13.70 percent chlorine. The foregoing may be expressed:

*Analysis.*—Calculated for $C_{14}H_{11}ClN_2O$ (percent): C, 64.99; H, 4.29; N, 10.83; Cl, 13.20. Found (percent): C, 65.02; H, 3.98; N, 10.70; Cl, 13.70.

EXAMPLE II

To a mixture of 13.6 g. of 2'-benzoyl-4,4'-dichlorobutyranilide, 1.0 g. of sodium iodide and 125 ml. of ethanol is added 4.0 g. of potassium cyanide in 25 ml. of water, and the reaction mixture is stirred for 48 hours. Then 75 ml. of water are added and the by-product removed by filtration. The by-product is 1-(2-benzoyl-4-chlorophenyl)-2-pyrrolidinone. The filtrate is diluted with water, and there is filtered off the same compound as prepared by Example I: 2-amino-5-chloro-3-phenyl-3H-indol-3-ol.

EXAMPLE III

To a mixture of 13.6 g. of 2'-benzoyl-4'-chlorohexanoylanilide and 125 ml. of dimethoxyethane is added a solution of 4.0 g. of potassium cyanide in 25 ml. of water. After stirring for 48 hours, the reaction mixture is diluted with 75 ml. of water and filtered from impurities. The filtrate is diluted with a large volume of water to precipitate out the product which is the same as prepared by Example I: 2-amino-5-chloro-3-phenyl-3H-indol-3-ol.

Proceeding as above, the following starting materials yield the following products:

| Starting material: | Product |
|---|---|
| (A) 2' - (2-fluoro-5-methylbenzoyl) - 2,2,4' - trichloro-acetanilide | 2 - amino-5-chloro-3-(2-fluoro-5 - methylphenyl)-3H-indol-3-ol. |
| (B) 2'-(2 - ethoxybenzoyl-2,2,4' - trichloro-acetanilide | 2-amino-5-chloro-3 - (2-ethoxyphenyl) - 3H-indol-3-ol. |

EXAMPLE IV

Following the procedure of Example III, but utilizing 2,2,5'-trichloro-2'-(2-chloro - 5 - sulfamoylbenzoyl)-4'-sulfamoylacetanilide as the 2-benzoylanilide affords 2-amino-6-chloro-3-(2-chloro - 5 - sulfamoylphenyl)-3-hydroxy-3H-indole-5-sulfonamide.

*Analysis.*—Calculated for the product

(percent): C, 35.17; H, 3.16; N, 11.71; Cl, 14.82; S, 13.41; $H_2O$, 5.64. Found (percent): C, 34.82; H, 2.75; N, 11.66; Cl, 15.08; S, 13.67; $H_2O$, 5.55.

EXAMPLE V

The following example illustrates the preparation, from a compound having Formula II, of compounds having Formulae IV and V, the latter being respectively, 5-chloro-1-(2,2-dichloroacetyl)-2-imino - 3 - (m-sulfamoylphenyl)-3-indolinol and 2-amino-5-chloro-3-(m-sulfamoylphenyl)-3H-indol-3-ol.

To a suspension of 34 g. of 2,2,4'-trichloro-2'-(m-sulfamoylbenzoyl)acetanilide in 400 ml. of ethanol is added a solution of 20 g. of potassium cyanide in 100 ml. of water. After stirring at room temperature for 1½ hours, the reaction mixture is concentrated to dryness and the residue dissolved in water. Acidification with acetic acid produces a solid which is suspended in dilute hydrochloric acid and filtered from 15.4 g. of insoluble material. Neutralization of the filtrate with sodium carbonate gives 5.7 g. of product, 2-amino-5-chloro-3-(m-sulfamoylphenyl) 3H-indol-3-ol, which is recrystallized from an alcohol-water solution and has a melting point of 216–218° C. In infrared illumination the product has peaks at 6.07μ, 6.35μ, 7.72μ and 8.57μ.

*Analysis.*—Calculated for $C_{14}H_{12}ClN_3Cl_3S$ (percent): C, 49.78; H, 3.58; N, 12.44; Cl, 10.49; S, 9.49. Found (percent): C, 49.81; H, 3.45; N, 12.61; Cl, 10.6; S, 9.6.

The 15.4 g. of above insoluble material is recrystallized from a dimethylformamide-water solution, to yield 5-chloro-1-(2,2-dichloroacetyl) - 2 - imino-3-(m-sulfamoyl-phenyl)-3-indolinol, having a melting point of 269–270° C. In infrared illumination, the product has peaks at 5.84μ, 6.14μ, 6.26μ, 7.86μ and 8.80μ.

*Analysis.*—Calculated for $C_{16}H_{12}Cl_3N_3O_4S$ (percent): C, 42.82; H, 2.70; N, 9.36; Cl, 23.71; S, 7.15. Found (percent): C, 42.92; H, 2.58; N, 9.24; Cl, 23.1; S, 7.1.

Following the above procedure and substituting the appropriate starting compounds the following products may be prepared:

(A) 5-bromo-1-(4,4-dibromobutyryl)-2-imino-3-(2-bromo-4-sulfamoylphenyl)-3-indolinol;
(B) 2-amino-5-bromo-3-(2-bromo-4-sulfamoylphenyl)-3H-indol-3-ol;
(C) 2-imino-1-(3-iodopropionyl)-5-iodo-3-phenyl-3-indolinol;
(D) 2-amino-5-iodo-3-phenyl-3H-indol-3-ol;
(E) 1-acetyl-3-(m-chlorophenyl)-2-imino-7-sulfamoyl-3-indolinol;
(F) 2-amino-3-(m-chlorophenyl)-7-sulfamoyl-3H-indol-3-ol;
(G) 2-imino-4-methoxy-3-(m-methoxyphenyl)-1-propionyl-3-indolinol;
(H) 2-amino-4-methoxy-3-(m-methoxyphenyl)-3H-indol-3-ol;
(I) 5-butanoxy-3-(m-butanoxyphenyl)-1-butyryl-2-imino-3-indolinol;
(J) 2-amino-5-butanoxy-3-(m-butanoxyphenyl)-3H-indol-3-ol;
(K) 1-acetyl-6-ethoxy-3-(2-ethoxy-4-iodophenyl)-2-imino-3-indolinol;
(L) 2-amino-6-ethoxy-3-(2-ethoxy-4-iodophenyl)-3H-indol-3-ol;
(M) 2-imino-5-methyl-3-(m-tolyl)-1-pentanoyl-3-indolinol;
(N) 2-amino-5-methyl-3-(m-tolyl)-1-pentanoyl-3H-indol-3-ol;
(O) 5-butyl-3-(m-butylphenyl)-1-(2-chloroacetyl)-2-imino-3-indolinol;
(P) 2-amino-5-butyl-3-(m-butylphenyl)-3H-indol-3-ol.

EXAMPLE VI

In a procedure similar to Example V, 5-chloro-3-(2-chloro - 5 - sulfamoylphenyl)-1-(2,2-dichloroacetyl)-2-imino-3-indolinol is prepared from 2,2,4'-trichloro-2'-(2-chloro-5-sulfamoylbenzoyl)acetanilide and potassium cyanide. The product has a melting point of 203–205° C. and is obtained as the hemi-alcoholate.

Analysis.—Calculated for $C_{16}H_{11}Cl_4N_3O_4S \cdot \frac{1}{2}C_2H_6O$ (percent): C, 40.33; H, 2.79; N, 8.30; Cl, 28.02; S, 6.34. Found (percent): C, 39.61; H, 3.03; N, 8.11; Cl, 27.6; S, 6.7.

Also isolated from the reaction as the hemi-hydrate is 2-amino-5-chloro-3-(2-chloro - 5 - sulfamoylphenyl)-3H-indol-3-ol.

Analysis.—Calculated for $C_{14}H_{11}Cl_2N_3OS \cdot \frac{1}{2}H_2O$ (percent): C, 44.10; H, 3.17; N, 11.02; Cl, 18.60; S, 8.41. Found (percent): C, 44.29; H, 3.04; N, 10.95; Cl, 18.6; S, 8.2.

In like manner the following starting materials are converted to the following products respectively:

| Product | Starting material |
|---|---|
| (A) 4,4,4' - trifluoro - 2' - (m-sulfamoylbenzoyl)butyranilide | (A₁) 5-fluoro-1-(4,4-difluorobutyryl)-2-imino-3-(m-sulfamoylphenyl)-3-indolinol. |
| | (A₂) 2-amino-5-fluoro-3-(m-sulfamoylphenyl)-3H-indol-3-ol. |
| (B) 2,2,dichloro - 2' - (2-chloro - 5-sulfamoylbenzoyl)-4'-fluoroacetanilide | (B₁) 3-(2-chloro-5-sulfamoylphenyl)-1-(2,2-dichloroacetyl)-5-fluoro-2-imino-3-indolinol. |
| | (B₂) 2-amino-3-(2-chloro-5-sulfamoylphenyl)-5-fluoro-3H-indol-3-ol. |

EXAMPLE VII

The following example illustrates the preparation from a compound (IV) of a compound (V), the latter being 2-amino-5-chloro-3-(2-chloro - 5 - sulfamoylphenyl)-3H-indol-3-ol.

A suspension of 1.9 g. of 5-chloro-3-(2-chloro-5-sulfamoylphenyl))-1-(2,2-dichloroacetyl)-2-imino - 3 - indolinol in 50 ml. of water is heated with 5 ml. of 4 N dilute sodium hydroxide. The mixture is heated on a steam bath for 1 hour and cooled. The cool reaction mixture is acidified by the addition of acetic acid, and a precipitate forms. The precipitate is filtered out and twice recrystallized from an alcohol-water mixture. The product, 2-amino-5-chloro-3-(2-chloro-5-sulfamoylphenyl)-3H-indol-3-ol, has a melting point of 215–216° C.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed.

What is claimed is:

1. A compound of the formula

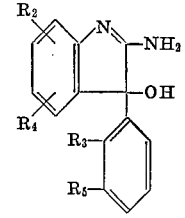

where $R_1$ is selected from the class consisting of lower alkyl, halo(lower)alkyl, and dihalo(lower)alkyl;

$R_2$ and $R_3$ are the same or different members selected from the class consisting of hydrogen, halogen, lower alkyl and lower alkoxy; and $R_4$ and $R_5$ are the same or different members selected from the class consisting of hydrogen and sulfamoyl.

2. A compound as defined in claim 1 which is 2-amino-5-chloro-3-phenyl-3H-indol-3-ol.

3. A compound as defined in claim 1 which is 2-amino-5-chloro-3-(m-sulfamoylphenyl)-3H-indol-3-ol.

4. A compound as defined in claim 1 which is 2-amino-5-chloro-3-(2-chloro-5-sulfamoylphenyl)-3H-indol-3-ol.

5. A compound as defined in claim 1 which is 2-amino-6-chloro-3-(2-chloro - 5 - sulfamoylphenyl) - 3 - hydroxy-3H-indole-5-sulfonamide.

6. A process for the preparation of a compound selected from the group of those having the formula:

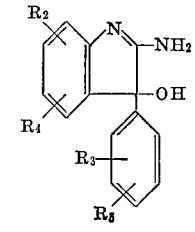

where $R_1$ is selected from the class consisting of lower alkyl, halo(lower)alkyl, and dihalo(lower)alkyl;

$R_2$ and $R_3$ are the same or different members selected from the class consisting of hydrogen, halogen, lower alkyl and lower alkoxy; and $R_4$ and $R_5$ are the same or different members selected from the class consisting of hydrogen and sulfamoyl;

which comprises contacting a 2-benzoylacylanilide of the formula

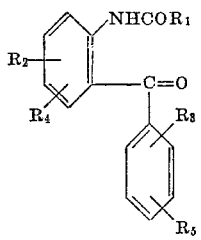

wherein $R_1$, $R_2$, $R_3$, $R_4$ and $R_5$ are defined as above, with an ionic cyanide selected from the group consisting of sodium cyanide, lithium cyanide, calcium cyanide, cuprous cyanide and potassium cyanide in the presence of a proton donor for a period of about 15 minutes to about 72 hours at a temperature range from about 0° C. to about 50° C., and hydrolyzing the reaction product.

References Cited

UNITED STATES PATENTS 3,441,570    4/1969    Meyer _____ 260—325

NICHOLAS S. RIZZO, Primary Examiner

J. A. NARCAVAGE, Assistant Examiner

U.S. Cl. X.R.

260—326.11, 326.15, 562, 999